(12) United States Patent
Pirbhai et al.

(10) Patent No.: US 7,756,998 B2
(45) Date of Patent: Jul. 13, 2010

(54) MANAGING L3 VPN VIRTUAL ROUTING TABLES

(75) Inventors: Shafiq Pirbhai, Kanata (CA); Vinod Prabhu, Kanata (CA); Benjamin David Washam, Ottawa (CA)

(73) Assignee: Alcatel Lucent, Paris (FR)

(*) Notice: Subject to any disclaimer, the term of this patent is extended or adjusted under 35 U.S.C. 154(b) by 1283 days.

(21) Appl. No.: 10/775,214

(22) Filed: Feb. 11, 2004

(65) Prior Publication Data

US 2005/0188106 A1     Aug. 25, 2005

(51) Int. Cl.
*G06F 15/173* (2006.01)
(52) U.S. Cl. .................. 709/242; 709/238; 709/230
(58) Field of Classification Search .............. 709/242, 709/230, 238

See application file for complete search history.

(56) References Cited

U.S. PATENT DOCUMENTS

| 7,139,838 | B1 * | 11/2006 | Squire et al. | 709/242 |
| 2002/0172207 | A1 * | 11/2002 | Saito et al. | 370/400 |
| 2004/0255028 | A1 * | 12/2004 | Chu et al. | 709/227 |

OTHER PUBLICATIONS

Y. Rekhter, T. Li, RFC1771—A Border Gateway Protocol 4 (BGP-4), Mar. 1995, pp. 1-6, 35-45.*

Y. Rekhter, Eric Rosen, RFC2547bis—BGP/MPLS IP VPNs, Sep. 2003, pp. 1-14, 21-31.*

Semeria, Chuck, RFC 2547bis: BGP/MPLS VPN Fundamentals, Juniper Networks, Inc., 2001.

* cited by examiner

*Primary Examiner*—Vivek Srivastava
*Assistant Examiner*—Ryan J Jakovac
(74) *Attorney, Agent, or Firm*—Kramer & Amado P.C.

(57) ABSTRACT

A method of managing virtual routing forwarding (VRF) tables at a provider edge PE router of a L3 virtual private network (VPN) is provided. An import route target (ImpRT) tree is maintained at the PE router, which keeps the association between all ImpRT attributes currently configured on said PE router and the virtual routing table VRF at that router. When an ImpRT attribute is configured on a VRF table, the PE router first searches the tree to identify a local VRF table that contains a route(s) with that ImpRT attribute. If this information is available locally, the VRF is updated by copying the route information, and there is no need to do a route refresh. When an ImpRT is deleted from a VRF, a route refresh is avoided by parsing all the routes in the VRF and removing the routes that no longer have a matching route target. In an alternative implementation, the local source is the master RIB (routing information base) which includes all routes in all VRFs at the router, and optionally even rejected routes that were filtered out using ImpRTs. In this variant, even routes associated with ImpRTs that are new to the router would be available to update the VRF without requiring a route refresh.

11 Claims, 5 Drawing Sheets

| Route # | Dest | Next hop | I/F | Outer label | Inner label |
|---------|---------|----------|-----|-------------|-------------|
| Route 1 | Prefix1 | CE1 | if1 | 1001 | - |
| Route 2 | Prefix2 | PE2 | if2 | 1004 | 11 |
| Route 3 | Prefix1 | CE2 | if4 | 1002 | - |
| Route 4 | Prefix2 | PE2 | if2 | 1005 | 11 |
| Route 5 | Prefix1 | CE3 | if3 | 1003 | - |
| Route 6 | Prefix2 | PE3 | if2 | 1006 | 11 |
| Route 7 | Prefix3 | PE3 | if2 | 1007 | 66 |

FIGURE 2

Import Route Targets at a PE

| #  | ImpRT   | VRF   |
|----|---------|-------|
| 1  | 100:100 | VRF A |
| 2  |         | VRF B |
| 3  | 200:200 | VRF C |
| 4  |         | VRF D |
| 5  |         | VRF M |
| 6  | 300:300 | VRF B |
| 7  |         | VRF L |
| 8  |         |       |
| .  |         |       |
| N  | X00:X00 | VRF X |
| .  | .       | .     |

MANAGING L3 VPN VIRTUAL ROUTING TABLES

FIELD OF THE INVENTION

The invention is directed to virtual private networks (VPN) and in particular to managing the L3 (Layer-3) VPN virtual routing tables.

BACKGROUND OF THE INVENTION

A private network is a collection of computers administered by a single organization and installed at one or more sites for sharing information freely. Initially, the sites of a private network were connected to each other via dedicated leased lines to ensure privacy. This model was replaced by virtual private networks (VPN), which enable service providers to efficiently share their high cost infrastructure among many paying customers, while delivering customized services.

To satisfy a broad range of customers, service providers must offer subscribers different VPN service delivery models, because each subscriber has different security concerns, number of sites, users, routing complexity, traffic patterns, traffic volume, etc. The VPN models have evolved over the years with a view to better accommodate this diversity and also, to keep pace with the evolution of network communication protocols and emergence of data services. For example, Frame Relay (FR) VPNs and ATM VPNs operate at L2; MPLS-based provider provisioned VPNs (PP VPN) also operate at L2, while and BGP/MPLS or IETF RFC2547bis VPNs operate at L3.

The L3 VPN model uses BGP (border gateway protocol) to distribute the routing information across the service provider's backbone network, and uses MPLS (multi-protocol label switching) to forward VPN traffic from one VPN site to another. A customer site is connected to the service provider network by a customer edge (CE) device, which communicates with a provider edge (PE) router in the service provider network, over an access data link.

A CE device can be a host, a Layer 2 switch, or more commonly, an IP router that establishes an adjacency with its directly connected PE router, using e.g. RIPv2, OSPF, etc. A PE router may forward packets on one or more VPNs; the service provider associates each port with a virtual routing and forwarding (VRF) table to each VPN that uses the respective PE router. After the adjacency between the CE and the ingress PE router is established, the CE device advertises the site's local VPN routes to the PE router. The PE router in turn exchanges these routes as VPN-IP routing information, using BGP, with other PE routers with which BGP peers have been established. In this way, all PE routers on a VPN learn remote VPN routes from the other peer PE routers and maintain and update the routing information in the respective VRF.

A White Paper RFC 2547bis entitled "BGP/MPLS VPN Fundamentals" (Semeria et al.), describes a VPN service model for efficiently scaling the network while delivering revenue-generating, value-added services. This RFC specifies a L3 VPN service that uses BGP-4 to exchange VPN-IPv4 routes between provider edge (PE) routers, and ensures simultaneous operation of a plurality of VPNs over the same physical network, using VRFs, route distinguishers (RD) and route filtering based on route target (RT) attributes.

While this technique allows segregating the routing information between various VPNs, it introduces performance issues due to the high tax on network bandwidth consumed during route refreshes in the VRF tables triggered by changes in the routing data. A route refresh is requested by a PE router with a view to get routes from peer PE routers that could potentially match newly created/deleted VRFs import route targets at that PE. A route refresh request is sent to all connected PEs, which in turn respond by sending back the route information for all their VRFs pertinent to the respective VPN.

There is a need to efficiently setup and maintain a L3 VPN, for reducing the unnecessary bandwidth and processing resources that are consumed by the prior art approaches for updating the routes in a L3 VPN.

SUMMARY OF THE INVENTION

It is an object of the invention to provide a method of managing L3 VPN virtual routing and forwarding tables that alleviates totally or in part the drawbacks of the prior art methods.

It is another object of the invention to provide a method of managing L3 VPN virtual routing tables that seeks to reduce the need to perform route refreshes, which consume network bandwidth and router processing resources.

Accordingly, the invention provides a method of managing virtual routing forwarding (VRF) tables at a provider edge PE router of a L3 virtual private network (VPN). The PE router maintaining a VPN-IP master routing information base (RIB) and a sub-RIB for each the VRF table, comprising the steps of: generating an import route target (ImpRT) tree comprising all ImpRT attributes currently configured on the PE router; modifying an ImpRTi attribute in a VRFi table; searching the ImpRT tree for a match to the ImpRTi attribute to identify a VRFm table that contains a route Rm with the ImpRTi attribute; and updating the VRFi table accordingly.

The invention also provides for a tree data structure at a provider edge PE router, the tree data structure comprising for each import route target ImpRT attribute configured on the PE router, a pointer to a virtual routing forwarding VRF table that comprises routes with the respective ImpRT attribute.

According to a further aspect, the invention is directed to a tree data structure stored on a computer-readable medium for enabling modification of virtual routing forwarding (VRF) tables at a PE router, comprising, for each import route target ImpRT attribute configured on the PE router, a pointer to a VRF table that comprises routes with the respective ImpRT attribute.

The ability to efficiently setup and maintain a virtual private network is important to service provider customers. Advantageously, the invention provides a method of updating the routes of the VPN network, such as e.g. VPN-IPv4 routes used by L3 VPNs, which is more bandwidth and processing efficient than the current methods.

BRIEF DESCRIPTION OF THE DRAWINGS

The foregoing and other objects, features and advantages of the invention will be apparent from the following more particular description of the preferred embodiments, as illustrated in the appended drawings, where.

DETAILED DESCRIPTION OF THE PREFERRED EMBODIMENTS

A short review of the operation of a VPN is provided, defining the terms used in the description of the present invention. VPNs ensure segregation of user domain IP address space using route distinguishers (RD), and constrain distribution of routing information at a provider edge (PE) router using forwarding tables VRF. User domain segregation is performed at the ingress PE router, while filtering of the routing information is performed by the egress PE router.

Each customer site within a VPN is assigned a unique route distinguisher, which identifies the PE interface linked to that site. The PE adds the site RD to the IP address of the routes advertised by each CE node within the customer site to create an extended address known as a VPN-IP address. This VPN-IP address uniquely identifies each endpoint in the VPN, even if the customer site is using unregistered private IP addresses. In the service provider's network, the routes for a VPN are identified based on the RD.

Since a single forwarding table on a PE router that has multiple sites from multiple disjoint VPNs does not allow per VPN segregation of routing information, the PE router uses VRF tables to constrain distribution of routing information. Thus, each customer port on the PE is associated with a VRF table, via configuration management at provisioning time. Note that a VRF table does not necessarily correspond to a particular VPN. Its purpose is to hold routes that are available to a particular site connected to a PE router over a given interface. If a site has multiple VPNs, the VRF associated with that site contains routes from all the VPNs of which it is a member. The VRF table provides the PE router with per VPN (i.e. per set of directly attached sites with common VPN membership) forwarding information for packets received from CEs.

A VRF table is populated with IP routes received from all directly connected customer edge (CE) routers on all sites associated with the VRF table. The tables are also populated with routes received from all peer PE routers; communication between the PE routers uses BGP to propagate the VPN-IP routes between the VRF tables. These BGP advertised VPN-IP routes are first stored in a Master RIB in BGP and then populated into the appropriate VRF tables (VRF sub-ribs in BGP and then VRF tables in the RDB). Since a VRF table is not mapped directly on to a VPN, it is necessary to identify in the VRF the VPN to which each route applies. This is achieved by means of route targets, which are BGP extended community attributes.

Every route that is distributed from a VRF is tagged with an export route target attribute (ExpRT) indicating its VPNs. Each VRF table is tagged with one or more import route target attributes (ImpRT) to indicate the VPNs that it wants to import routes for. When routes are distributed, any route marked with a particular ExpRT attribute will be installed in VRF tables marked with the same ImpRT attribute. A VRF on a peer PE that receives a route with an ExpRT attribute must configure an ImpRT matching this attribute of the route in order to accept it in the respective VRF.

Figure 1A:
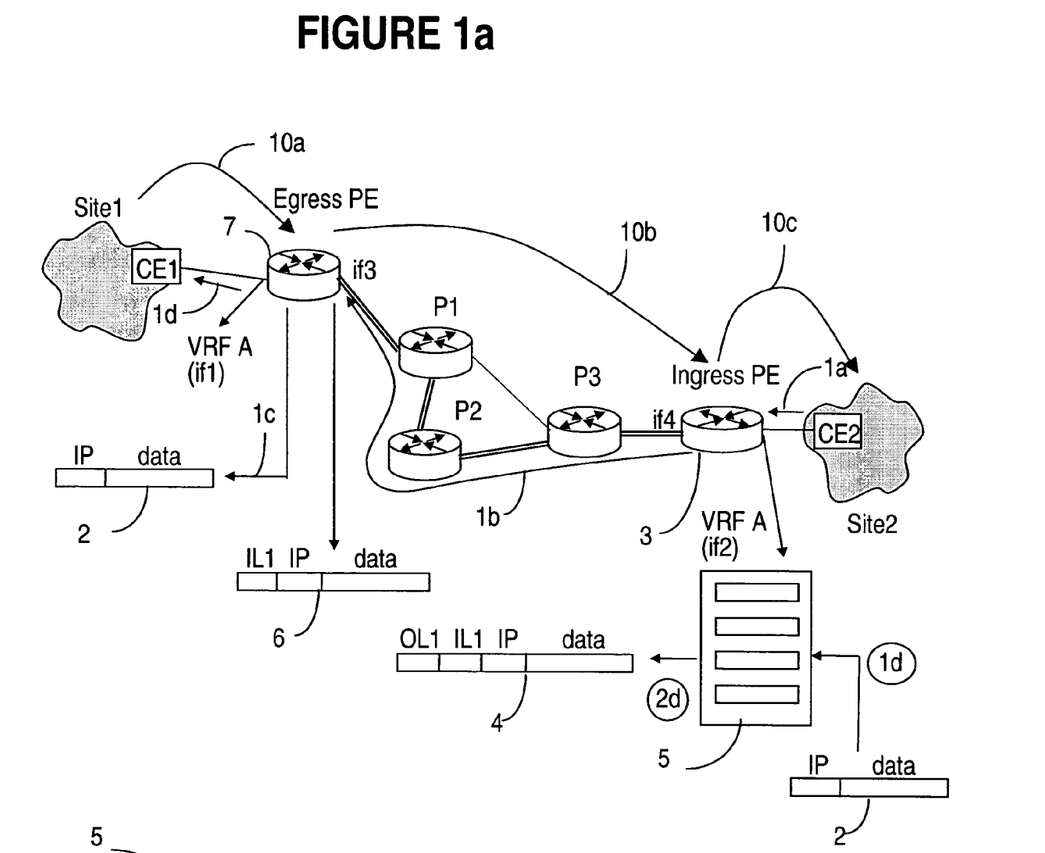
FIG. 1a shows an example of packet forwarding in a virtual private network (VPN)

In order to enable packet forwarding, the VPN needs to be first configured, as shown in the example of FIG. 1a. This example describes and illustrates how a packet is transmitted in a VPN from a host in customer site Site2 to a host in customer site Site1. As shown, a CE router CE2 at site Site2 is connected to an ingress PE router 3 over e.g. PE interface if2 for enabling routing the customer traffic from the host to the provider network. Similarly, an egress PE router 7 is connected to a CE router CE1 at site Site1 over e.g. PE interface if1 for enabling routing of the customer traffic from the provider network to the host in Site1. The PE routers are connected over a plurality of provider routers P1, P2 and P3.

The data flow, shown by arrows 1a-1d, forwards customer data (IP packets) from the host in Site2 to the host in Site1. A traffic control flow, shown by arrows 10a-10b, is used for VPN-IP route distribution and label switch path (LSP) establishment. A first control sub-flow is used to exchange routing information between the CE and PE routers and between the PE routers across the provider's network. Thus, for establishing the CE2-CE1 route, first the egress PE router 7 establishes a peer relationship with CE1 over interface if1, as shown by arrow 10a, using a routing protocol for PE-CE communication. This could be for example RIP, BGP, OSFP, or static routing. Similarly, the ingress PE router 3 establishes a peer relationship with CE2 over interface if2, as shown by arrow 10c. The ingress and egress PE routers establish a peer relationship over provider network, as shown by arrow 10b.

Since the packets need to be forwarded within the service provider network along routes computed with VPN-IP addresses, and the IP header does not support the multiplexing of all VPN traffic over the same provider network, MPLS is used for forwarding within the provider network. A second control sub-flow is responsible for establishment of a label switched paths (LSP) across network, between the PE routers over the provider routers in the provider network. In this example a LSP path is established between ingress PE router 3, interface if4 and egress PE router 7, interface if3, over provider routers P3, P2 and P1 and shown in double lines.

Then, CE1 advertises the IP routes in Site1 to PE router 7. Also, egress PE router 7 advertises the routes of CE1 as VPN-IP routes, with an inner label that specifies the CE over the CE-PE interface. Communication between the PE routers uses BGP that transports the VPN-IP routes between the VRF tables, as discussed above. Let us assume that in this example, an inner label IL1 specifies CE1 on interface if1 (between CE1 and egress PE router 7).

MPLS is used to forward VPN traffic (data flow shown by arrows 1a-1d) from one VPN site to another. Let us assume that a packet 2 (IP header and users data) is sent from site Site2 to site Site1. At the ingress PE router 3, the packet 2 from CE2 receives an inner/bottom label (here IL1) for forwarding the packet to the correct CE (here CE1) at the egress PE router 7. Packet 2 also receives an outer (top) label (here OL1) used for forwarding from the ingress PE router 3 to egress PE router 7 across the provider's network. The routers in the service provider's network maintain only internal routes, but no VPN routes. Thus, the IP packet 4 with the inner and outer labels IL1 and OL1 is routed from PE router 3, if4, over P3, P2, P1 to PE router 7, if3, based on the outer label OL1. At the egress PE router 7, the outer label OL1 is stripped, and packet 6 is routed from if3 to if1 based on the inner label IL1. At this point, the inner label IL1 is also stripped to obtain the original IP packet 2, which is forwarded to CE1 for routing according to its IP address.

Figure 1B:
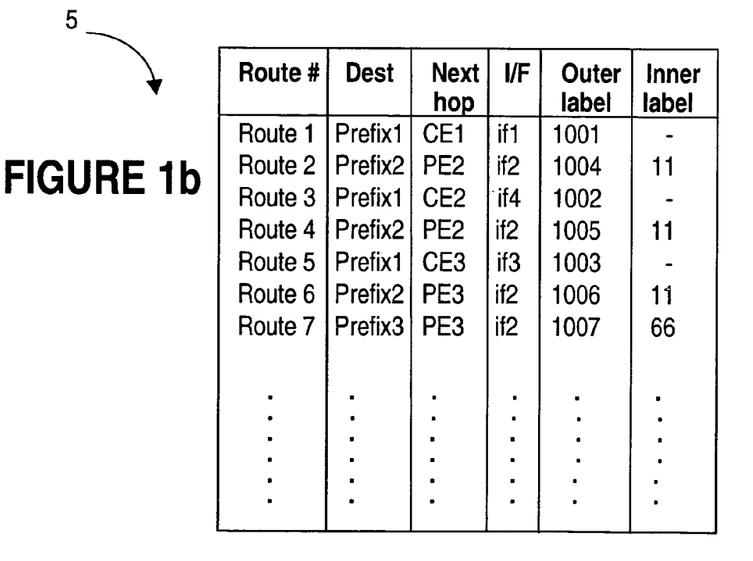
FIG. 1b illustrates an example of a VRF at a provider edge router.

FIG. 1b illustrates an example of a VPN routing and forwarding (VRF) table. The VRF table is expressed in terms of IP address prefixes, provides the next hop, the outgoing interface and the top and bottom label.

Figure 2:
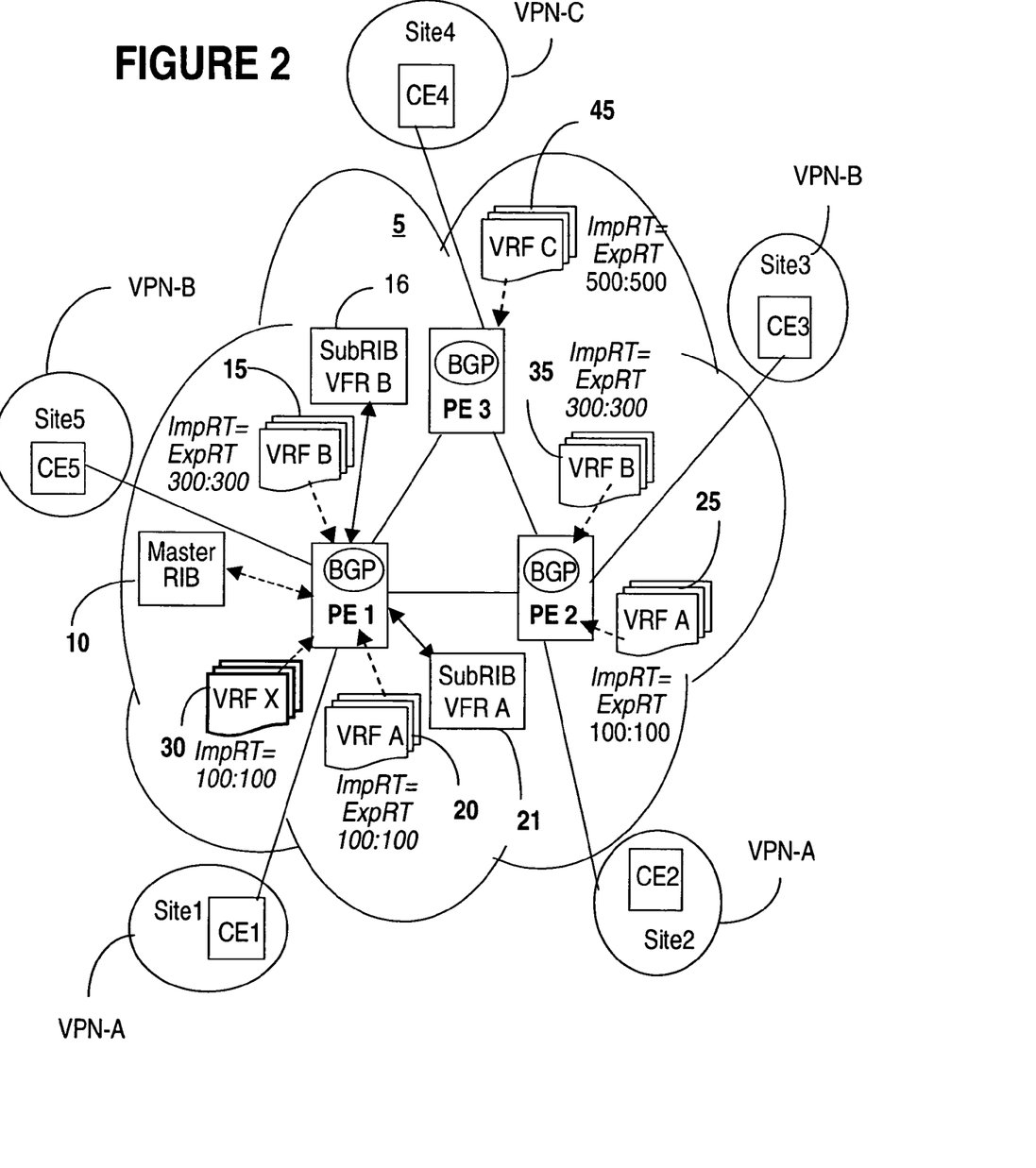
FIG. 2 illustrates an example of a service provider network with a plurality of L3 virtual private networks (VPN) to which the method according to the invention applies.

FIG. 2 illustrates a simplified configuration of a service provider (SP) network 5 with a plurality of L3 virtual private networks (VPN), with a view to illustrating the improvements provided by the present invention in the operation of these VPNs. As shown in FIG. 2, service provider network 5 delivers VPN services to different enterprise customers A, B, C, shown by customer edge routers CE1-CE5 at respective sits Site1-Site5. Service provider network 5 serves customer A over a VPN A, customer B over a VPN B and customer C over a VPN C. Each site has a CE router directly connected to a PE router over a data access link. In the example of FIG. 2, VPN-A connects CE1 at Site1 with CE2 at Site2, and VPN B connects CE3 at Site3 with CE5 at Site5. The network routers that route and switch the traffic between the edge routers are not illustrated; it is to be understood that a route between any two edge routers PE may use a diverse path within network 5.

As indicated above in connection with FIG. 1a, the PE router maintains the routing information for the routes it received from all directly connected CE routers in a respective VRF (virtual routing and forwarding) table, and may serve CE devices belonging to different customers, over a different VPN. It also keeps the routes it receives from all peer PE routers. In the example of FIG. 2, PE1 serves two customers, as shown by device CE1 (customer A) and device CE5 (customer B). As these customers communicate over different VPNs, from different sites, PE1 maintains a VRF for each site, i.e. VRF A 20 for customer A at site Site1 and VRF B 15 for customer B at site Site5. VRF A also keeps the routes between PE1 and PE2 used on VPN-A. Similarly, PE2 maintains a VRF A 25 for customer A (CE2 at Site2) and a VRF B 35 for customer B (CE3 at Site3). Finally, Site4 served by CE4 is connected to network 5 over PE3, which maintains a VRF C 45. It is to be noted that FIG. 2 only shows a limited number of sites for simplification. Thus, customer C is connected to the service provider network 5 in fact for exchanging traffic with sites that are not shown here.

Each route in a VRF is tagged with an export route target (ExpRT) and each VRF table is tagged with an import route target attribute (ImpRT) that indicate the VPNs that it wants to import routes for. The export route targets are associated to each route in the VRF as they are advertised to other PE routers, and the import route targets are used to filter similar advertisements from other PE routers. FIG. 2 shows only one import and export route target per VRF table for keeping the drawing simple; however, it is to be understood that multiple route targets may be listed in these tables. Also for brevity of the drawing, the VRFs in the example of FIG. 2 uses identical ImpRT and ExpRT.

The inter-site policy expressed by the route target attributes shown in the example of FIG. 2 results in VPN-A enabling any host in Site1 to exchange traffic with any host in Site2. Similarly, the inter-site policy for VNP-B enables any host in Site5 to exchange traffic with any host in Site3. The connectivity from Site1 to Site2 is enabled by router PE1 maintaining a VRF A 20 with an ImpRT 100:100 and router PE2 maintaining a VRF A 25 with an ExpRT 100:100. For the reverse direction, router PE1 uses an ExpRT of 100:100 and router PE2 uses an ImpRT of 100:100. Similarly, VRF B 15 at router PE1 is configured with an ExpRT attribute of 300:300 and VRF B 35 at router PE2 is configured with an ImpRT attribute of 300:300 for the Site5 to Site3 direction of traffic. The reverse direction on VPN B is enabled using an ExpRT of 300:300 at VRF B 35 and an ImpRT of 300:300 at VRF B 15.

While route targets are unique in network 5, an ImpRT can be associated with several VRFs on the same PE. Thus, it is possible that a newly added ImpRT of a VRF to be already present for a VRF configured previously at a PE router.

According to IETF RFC 2547bis, configuration of an VPN involves the following operations:

Set-up label switched paths (LSP) between the respective PE routers, which are in the above example routers PE1, PE2 and PE3.

Then, at each PE router:
Create a respective VRF for each site supported by a PE router. When routes are learnt into the VRF table, they are learnt as IP (e.g. IPv4) routes. In the above example, VRF A 20 and VRF B 15 are configured at router PE1, VRF A 25 and VRF B 35 at router PE2, and VRF C 45 at router PE3.

Associate router interfaces (physical or logical) with a respective VRF.

Assign a unique route distinguisher RD to each VPN, i.e. to each VRF.

Configure import and export policies for each VPN (VRF) at each PE, specifying the import (ImpRT) and export route targets (ExpRT) as extended communities. In this example, an ImpRT=ExpRT=100:100 is configured in VRF A, an ImpRT=ExpRT=300:300 is configured for VFR B and an ImpRT=ExpRT=500:500 is configured for VRF C.

Establish BGP peer connectivity between PE routers, with address family VPN-IP enabled.

Configure a per-VRF routing process (RIP, OSPF, static, etc.) between the PE and CE, and Re-distribute the CE advertised routes into BGP VPN-IP process.

Routes received at a PE from peers are VPN-IP routes (e.g. VPN-IPv4), each route being accompanied by the export route target configured on the originating VRF. They are first placed into the master routing information base (RIB) 10, as shown in FIG. 2, for PE1 only, after passing an initial input policy check. Then the process (BGP) determines which VRFs the routes need to be placed into (route filtering). ImpRTs configured on a VRF are used by BGP to filter VPN-IP routes that are learned from other PE routers. If a VRF has an ImpRT configured, then only the VPN-IP routes that contain this extended community as a path attribute are learned by this VRF (or in other words, the destination becomes reachable by this VRF). Routes that do not have matching extended community route targets are not learned by the VRF and are discarded. Each VRF is now associated with a sub-RIB that holds the routing information for that VRF. FIG. 2 illustrates only the sub-RIBs for PE1, which are sub-RIB 21 associated to VRF A 20 and sub-RIB 16 associated to VRF B 15.

Let's assume a first scenario whereby a new VRF, shown in FIG. 2 as VRF X 30, should be added at PE1. This could happen for example if a new site for a new VPN is added at PE1 the new VPN enabling connectivity of the new site with hosts in Site1 and Site2. In this case, VRF X 30 is configured with an ImpRT attribute of 100:100 to accept routes from Site1 and Site2.

In the current implementation of the VPN community attributes, the BGP must perform a "route refresh" in order to get routes from other PE routers that could potentially match the newly created VRFs import route target. The route refresh request is sent to all connected PE routers, which in turn respond by sending the route information for all their VRFs. Using the example of network provided in FIG. 2, PE1 requests all the routes from all VRFs at both PE2 and PE3. In response, PE2 and PE3 will send to PE1 all the routes in the VRF A 25, VRF B 35 and VRF C 45.

As another example, let's assume that the network provider wishes to add the hosts in Sit 1 to VPN-B. This means that the provider wishes to add all routes in VRF A to VRF B. In this second scenario, VFR A 20 is re-configured with a route target ImpRT of 300:300, which is the import route target of VFR B 15. In the current implementation, PE1 will send route refreshes to PE2 and PE3 to get all routes in all VRF tables at these peer routers. Again, in response to the route refresh request, PE2 and PE3 will send to PE1 all the routes in the VRF A 25, VRF B 35 and VRF C 45.

Route refreshes are akin to what happens when BGP comes up on a router, which is fairly taxing on network bandwidth, especially in a network with a large number of routers and routes. The routes received by/from peers are placed in the master RIB and then placed into the respective VRF tables. The BGP protocol uses route target filters for placing routes in the appropriate VRF tables, which now include the newly configured import route target. Only the routes that have ExpRT attributes that match with the added ImpRT attribute(s) of the new or modified VRF table will be added to the respective router. In the first scenario, only routes received from PE2 and PE3 that have an ExpRT of 100:100 need to be added in VRF X 30. In the second scenario, only routes that have an ExpRT of 300:300 need to be added in VRF A 20.

The route refresh mechanism may also cause routes that were previously discarded, to now be learnt by this VRF. For example, let's assume that all routes from VPN-C, which were previously discarded at PE1 are again discarded during filtering. Having the route refresh to PE3 send again the VPN-C routes, just to have them discarded again is unnecessary. Therefore, having all peer routers send all routes, as is done currently with route refreshes, is unnecessary in some cases. Unnecessary route refreshes waste network bandwidth and processing resources of the routers that send or receive the refresh routes requests. Also, having routes that were previously discarded to now be learnt again by a VRF only to be again discarded consumes processing power.

According to the invention, no route refresh and extra-processing is performed when the routes are available locally. Rather, a local source of routes is used to obtain these routes. In other words, whenever a VRF is modified to include an import route target ImpRT that already exists on the router, a local source of routes is used to update the VRF with the routes that have that ImpRT attribute within its path attributes.

In the preferred implementation, the local source of routes is another VRF on the same PE router that has the respective ImpRT configured on it. For example, in the first scenario, it can be seen that all the routes that are needed by VRF X 30 would be available locally in VRF A 20, and therefore all routes to PE1 with this import route target. In the second scenario, all the routes that need to be added to VRF A 20 are available locally in VRF B 15. In an alternative implementations, the local source is the master routing information base (RIB) available at the respective PE router. The master RIB contains all the routing information for a given topology for which the router is a part (i.e. all routes in all VRFs at that router), and holds network prefixes, route entries and labelled prefix routes. The master RIB includes may optionally include rejected routes that were filtered out using ImpRTs.

Figure 3:
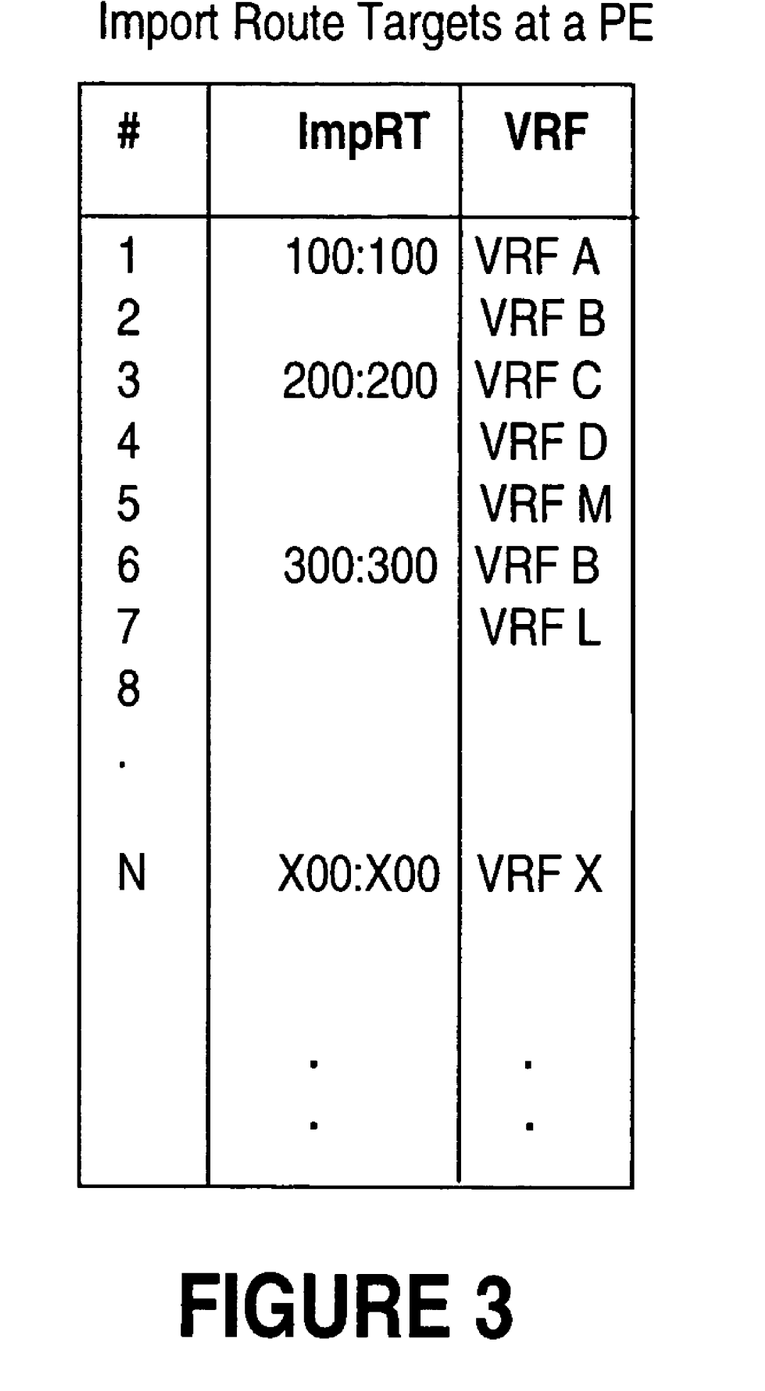
FIG. 3 shows an example of an import route target tree according to the invention.

More specifically, according to the preferred implementation, a tree that contains a unique set of all import route targets that are currently configured on the router is maintained. An example of such trees is shown in FIG. 3. For each ImpRT, the tree maintains a list of all VRFs that are currently configured with that particular ImpRT. When an ImpRT is configured on a VRF, let's say an ImpRT of 300:300 on VRF A at PE1, rather than requesting a route refresh, BGP searches for ImpRT=300:300 in the ImpRT tree. Once an entry is found, in this case # 6 on FIG. 2, it reads all routes from the first VRF table at that PE router that is already configured with this ImpRT attribute. In the example of FIG. 3, VFR B is the first VRF with a route target of 300:300 available at PE1, so that BGP can read all routes from this VRF table. It then filters the routes found in VRF B using all the import route targets including the new one, configured on VRF A before inserting them into the VRF A. This procedure is shown in the flowchart shown in FIG. 4.

Figure 4:
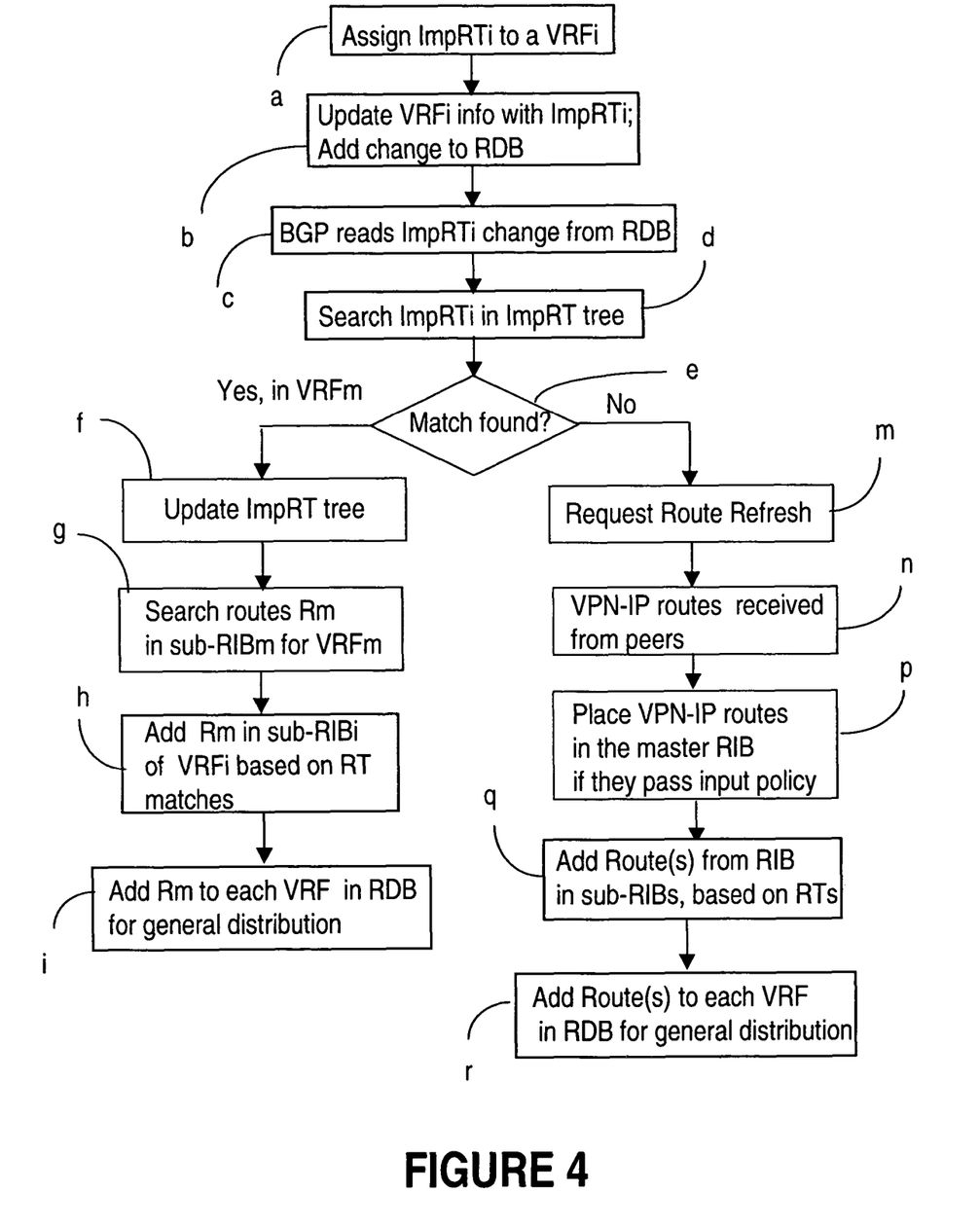
FIG. 4 shows the steps for assigning a new import route target (ImpRT) to a virtual routing and forwarding (VRF) table.

FIG. 4 illustrates the operations performed for adding a new import route target to a VRF. "RDB" stands for routing database, which includes all routing information for all processes used at the respective PE. Let's denote the ImpRT to be added with ImpRTi and the VRF table affected by the change with VRFi. Once the command line interface issues a request to add ImpRTi to VRFi, as shown by step a, the VRF information in the RDB is updated with the ImpRTi, step b. This change is also recorded in the RDB at the respective PE router. Then, the BGP (border gateway protocol) reads the ImpRTi change (addition) from the RDB, as shown at c.

According to the invention, a search for the ImpRTi is next performed in the ImpRT tree at the respective router, as shown at d, with a view to locate an existing ImpRT of the same value with that of ImpRTi. The ImpRT tree contains all the import route targets on the respective PE. As indicated above, in the existing implementations, the PE router requests at this point a route refresh and the BGP redistributes the routes. If the ImpRTi is found in the tree, as shown by the "Yes" branch of decision block e, it means that there is no need to perform a route refresh. Let's assume that the VRF that contains a matching ImpRT is VRFm. The ImpRT tree is updated by adding the VRFi at ImpRTm, shown in step f.

The master RIB contains all the VPN-IP routes that came originally from the transmitting (peer) PEs; a sub-RIBm contains all the VPN-IP routes in the respective VRF. Therefore, for updating the VPN with the added route(s), the master RIB needs to be accordingly updated, together with all affected sub-RIBs and VRFs, specifically sub-RIBi and VRFi. These updates use the RDB and take place as shown in steps g-j, described next.

First, the routes Rm of VRFm whose ImpRT attribute matches ImpRTi are identified in the sub-RIBm associated with VRFm, as shown at g. Next, as shown at h, the routes Rm found in VRFm are placed in the sub-RIBi based on route target matches. In step i, the routes are added to each VRF at the respective router for general distribution.

If a match is not found at e, a conventional route refresh operation is performed, as shown by the route refresh request in step m. The VPN-IP routes received from the peer routers in response to the request are then placed in the master RIB for re-distribution into VRFs, shown in steps n-r.

Figure 5:
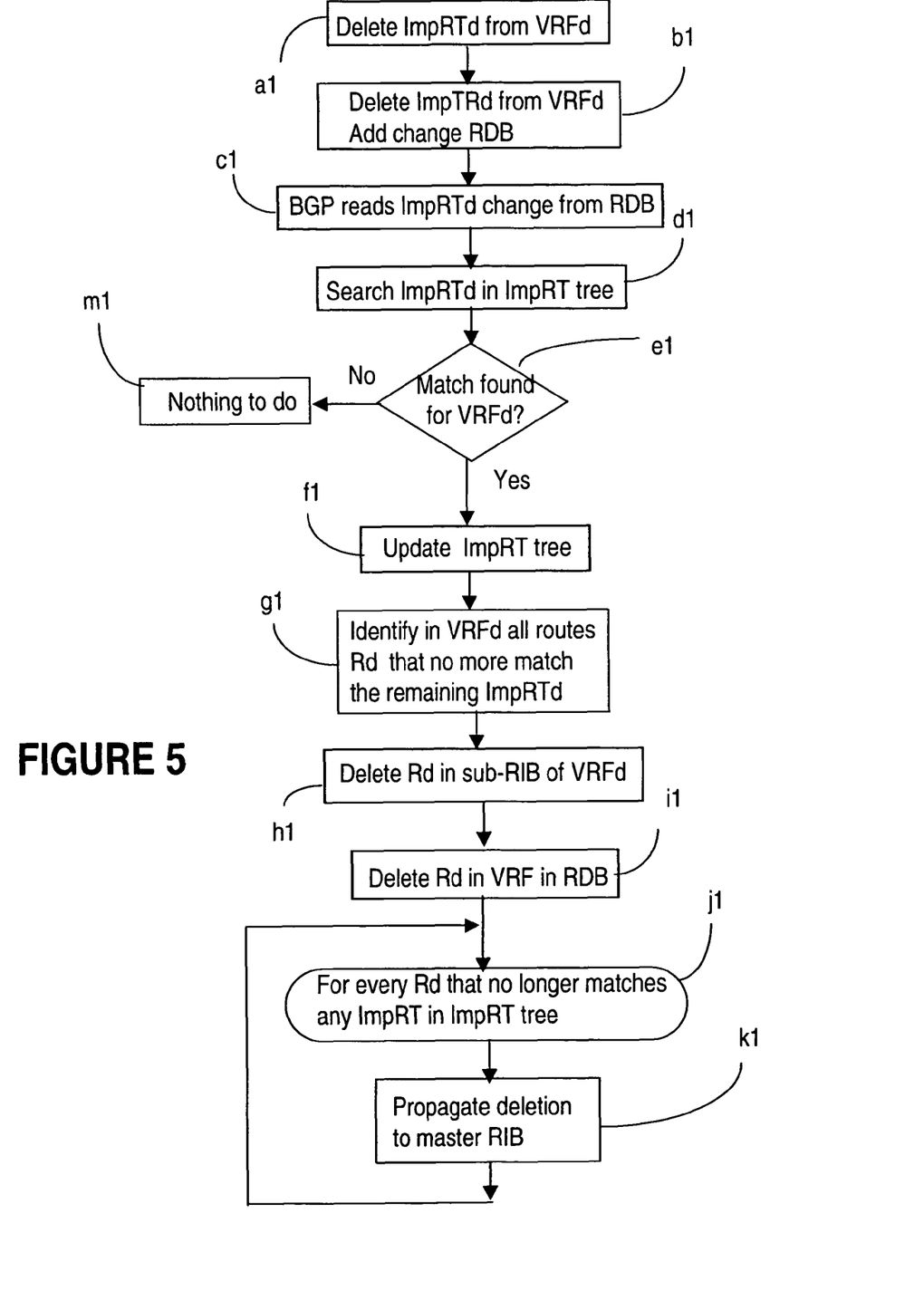
FIG. 5 illustrates the steps for deleting an ImpRT from a VRF table.

FIG. 5 shows how an ImpRT denoted with ImpRTd, is deleted from a VRF table according to the invention. In the prior art solution, when an ImpRT is removed, a route refresh request is made to the peer routers to re-send all their routes. All the routes received from the peers that no longer match the import route targets (the routes associated with the deleted ImpRTd) are removed from the master RIB, sub-RIBs and VRFs. This route refresh is avoided according to the invention, by parsing all the routes in the VRF and removing the routes that no longer have a matching route target.

As shown in FIG. 5, steps a1-c1 are similar to those described in connection with FIG. 4. Since the user performs the deletion of the ImpRTd, the VRFd that contains the deleted ImpRTd is known. In step c1, BGP reads ImpRTd from the RDB and searches in step d1 the ImpRT tree to see if a match can be found in a VRF at that PE. The reason of this search through the ImpRT tree is to remove the VRF from the list of VRFs associated to ImpRTd. If a match is found in VRFd, shown by branch "Yes" of decision block e1, the ImpRT tree is updated to reflect the deletion of the ImpRTd, as shown in step f1.

Next, all routes Rd that no more match the remaining ImpRTd are identified in VRFd, as shown in step g1 and all routes in the sub-RIB associated with VRFd that no longer match the remaining ImpRT on VRFd are deleted, as shown in step h1. As shown in step i1, routes Rd are also deleted from all respective VRFs in the RDB at that PE. The deletion of routes Rd is propagated to the master RIB, for every Rd that no longer matches any ImpRT in the ImpRT tree, as shown in steps j1 and k1.

For peers that do not support the route refresh feature, there is no way to get their routes if the need be in the prior art solution. In this case, the rejected routes may be maintained in a rejected routes tree for future use. In this way, there is no need to send a route refresh to the peers.

We claim:

1. A method of managing virtual routing forwarding (VRF) tables at a provider edge (PE) router of a L3 virtual private network (VPN), said PE router maintaining a VPN-IP master routing information base (RIB) and a sub-RIB for each said VRF table, comprising:
   maintaining an import route target (ImpRT) tree comprising all ImpRT attributes currently configured on said PE router;
   modifying an ImpRT attribute of a first VRF table in said PE router;
   searching said ImpRT tree for a match to said modified ImpRT attribute to identify a second VRF table in said PE router having a matching ImpRT attribute;
   for peers supporting a route refresh feature, performing a route refresh operation only when said match is not found;
   for peers that do not support the route refresh feature, maintaining rejected routes in a rejected routes tree;
   searching for routes in a sub-RIB associated with said second VRF table; and
   copying said routes from said sub-RIB into said first VRF table based on all route target attributes configured for said first VRF table, including said modified ImpRT attribute.

2. The method of claim 1, further comprising:
   maintaining a list of all ImpRT attributes at a PE node with said ImpRT tree, each ImpRT attribute being associated with all VRF tables that are currently configured with said modified ImpRT attribute.

3. The method of claim 1, further comprising:
   adding said modified ImpRT attribute to said first VRF table.

4. The method of claim 3, further comprising:
   updating said ImpRT tree to include an association between said modified ImpRT attribute and said first VRF table.

5. The method of claim 1, further comprising:
   adding said routes to each VRF table in a routing database available at said PE router.

6. The method of claim 2, wherein said searching is performed through said master RIB.

7. The method of claim 6, wherein said master RIB includes all routes in all VRF tables at said PE router and further includes all routes that were filtered out at said PE router using ImpRT attributes.

8. The method of claim 1, further comprising:
   removing said ImpRT from said first VRF table.

9. The method of claim 8, further comprising:
   parsing all routes in said first VRF table and removing all routes from said first VRF table that no longer match said ImpRT of said first VRF table.

10. The method of claim 9, further comprising:
    deleting all routes that no longer match from the sub-RIB of said first VRF table.

11. The method of claim 10, further comprising:
    deleting in said master RIB every route that no longer matches any ImpRT attribute in said ImpRT tree.

* * * * *